United States Patent [19]

Binden

[11] Patent Number: 4,711,415

[45] Date of Patent: Dec. 8, 1987

[54] X-WING HELICOPTER-SCOUT ATTACK CONFIGURATION

[75] Inventor: John A. Binden, Long Beach, Calif.

[73] Assignee: Northrop Corporation, Hawthorne, Calif.

[21] Appl. No.: 696,604

[22] Filed: Jan. 30, 1985

[51] Int. Cl.$^4$ ............................................. B64C 27/82
[52] U.S. Cl. ..................................... 244/17.19; 244/6; 244/7 R; 244/52; 244/55; 244/207
[58] Field of Search ............. 244/6, 7 R, 17.11, 17.19, 244/207, 55, 51, 52

[56] References Cited

U.S. PATENT DOCUMENTS

| | | | |
|---|---|---|---|
| 2,557,522 | 6/1951 | Vautier | 244/55 |
| 2,941,749 | 6/1960 | Sullivan et al. | 244/6 |
| 3,048,353 | 8/1962 | Holmes | 244/17.19 |
| 3,119,577 | 1/1964 | Andrews | 244/7 R |
| 3,351,304 | 11/1967 | Stein et al. | 244/17.19 |
| 3,957,226 | 5/1976 | Daggett, Jr. et al. | 244/17.19 |
| 4,040,578 | 8/1977 | Yuan | 244/17.19 |

Primary Examiner—Joseph F. Peters, Jr.
Assistant Examiner—Rodney Corl
Attorney, Agent, or Firm—Terry J. Anderson; Robert B. Block

[57] ABSTRACT

The present invention provides a single seat aircraft having the capabilities of vertical takeoff, landing and hovering operations utilizing the X-Wing as a conventional helicopter rotating wing. After transition to forward flight following takeoff, the rotating wing is stopped and becomes a fixed wing of "X" configuration. The aircraft utilizes two engines within the fuselage, one engine being positioned vertically above the other along the longitudinal axis of the aircraft, the particular arrangement of engines allowing aircraft size and weight to be substantially reduced.

10 Claims, 5 Drawing Figures

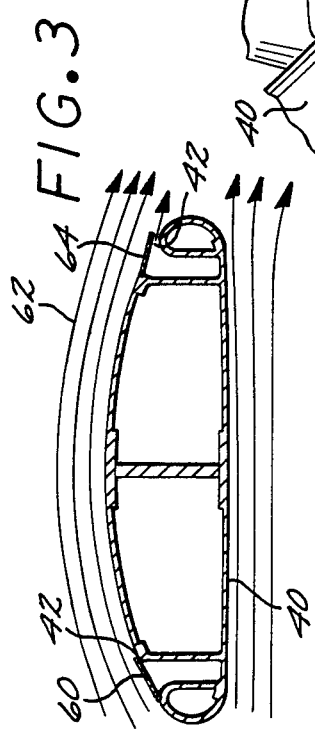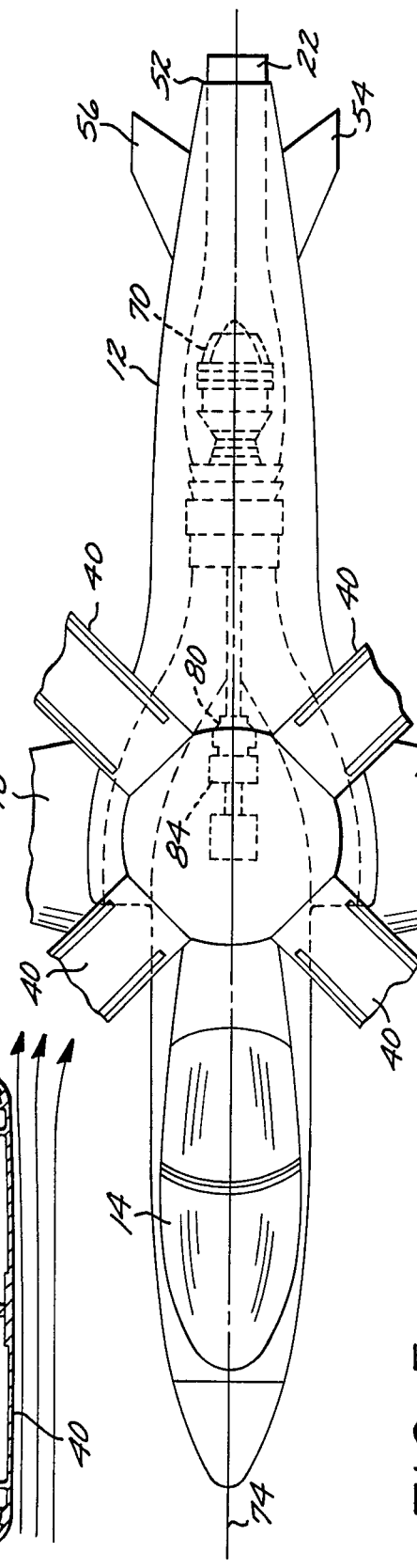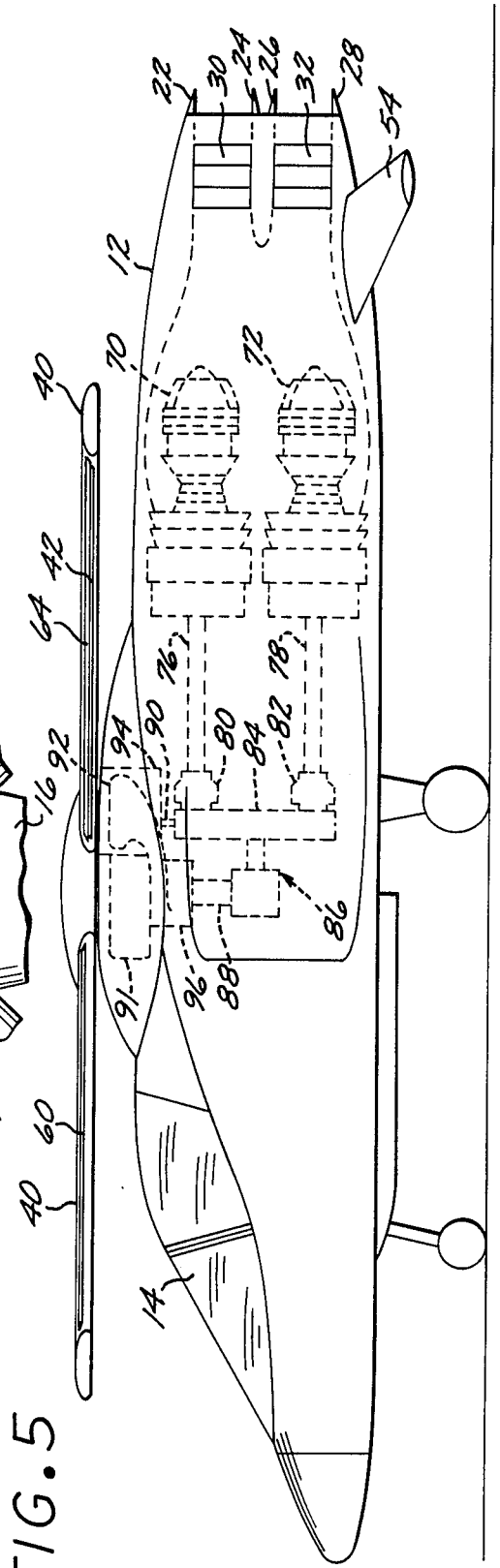

X-WING HELICOPTER-SCOUT ATTACK CONFIGURATION

BACKGROUND OF THE INVENTION

1. Field of the Invention

The present invention relates to a single seat aircraft capable of vertical takeoff, landings, and hovering operations which utilizes the X-Wing as a conventional helicopter rotating wing which after transition to the forward flight following takeoff is stopped and becomes a fixed wing of X configuration. The aircraft utilizes two engines within the fuselage, one engine being positioned vertically above the other engine along the longitudinal axis of the aircraft.

2. Description of the Prior Art

Helicopters, valued for their vertical takeoff, hovering and cruising capabilities have been available for commercial and military use for many years. Aircraft which use both the capabilities of a helicopter and fixed wing aircraft have also been available, at least in the design stages, for a number of years. A more recent development in this latter type of aircraft has been to provide a multi-blade (in the shape of an X) rotor which, after the aircraft reaches a desired cruising speed, stops rotating and the blades themselves operate as the fixed aircraft wing. In particular, a four engine aircraft having this capability has been developed, the aircraft being relatively large and heavy (on the order of 33,000 pounds). Two of the engines provide thrust, the remaining two remaining engines provide, among other functions, the power to drive the rotating wing blades. The two thrust engines are located on the fuselage, and the two engines utilized to drive the rotating wing blades are positioned side by side within the aircraft fuselage.

Typical of the prior art patents relating to helicopters and convertible aircraft are as follows:

U.S. Pat. No. 2,989,268 to Andrews describes a convertible aircraft capable of propulsion by a helicopter-type rotor and/or by thrust of the jet engine when using fixed wing surfaces; U.S. Pat. No. 3,807,662 to Velazquez discloses a helicopter devoid of a conventional exteriorly mounted anti-torque rotor and having it at the rear end of its aft fuselage a system utilized for auxiliary propulsion and anti-torque and directional control; U.S. Pat. No. 2,420,323 to Meyer et al discloses a multiple engine jet powered aircraft having the exhaust of the engines ducted to rectangular nozzles with vectoring flaps for pitch control; U.S. Pat. No. 3,139,936 to Davidson et al describes a helicopter in which lift on the blades is varied by the control of spanwise-extending fluid streams discharged therefrom; U.S. Pat. No. 3,362,660 to Tyler discloses an aircraft with laterally projecting control members each formed with elongated apertures on opposite sides of a bluff trailing edge portion and means for selectively discharging boundary layer control streams through different apertures in opposing directions to produce opposed lift and induced drag to retard the aircraft; U.S. Pat. No. 3,869,862 to Dickey discloses a pair of gas turbine engines positioned side by side which drive a main rotor assembly of a helicopter through a combined output gear box; U.S. Pat. No. 3,744,743 to Nay et al which discloses a helicopter power plant system using two turbine engines, each engine extending laterally within the fuselage resulting in a transmission/gearing system which enables one engine to take over if the other should fail; U.S. Pat. No. 3,119,577 to Andrews describes a convertible aircraft having a rotating wing for low speed flight and a fixed wing for high speed flight; U.S. Pat. No. 3,792,827 to Girard discloses an aircraft having a combined rotary and a fixed wing providing aerodynamic support in vertical takeoff and landing and in high speed cruising flight; U.S. Pat. No. 2,689,615 to Fletcher discloses a convertible type aircraft having a fixed wing portion and also a jet-driven lifting rotor; U.S. Pat. No. 3,588,273 to Kizilos describes a rotary wing aircraft wherein each rotor blade section includes variable deflection thruster jet flap means operable to control the lift produced by each section; and U.S. Pat. No. 2,557,522 to Vautier which discloses a fixed wing aircraft provided with twin jet units and a single fuselage, both jet units being arranged one above the other and offset to provide a small dimension for the main transverse frame of the fuselage.

Although the fixed X-wing/aircraft as briefly described hereinabove performs very satisfactorily in its helicopter/fixed wing configurations, the aircraft is designed primarily to carry supplies and/or transport troops, the design cruising speed not being fast enough to enable it to be used as an attack or scout aircraft. It would be desirable if the design features of the rotating-/fixed X-Wing could be adapted to a lighter aircraft (typically 13,000 pounds) and, due to its lightness, has the capability to reach cruising speeds when in the fixed wing configuration to enable the aircraft to be used for attack or scouting purposes.

SUMMARY OF THE PRESENT INVENTION

The present invention provides a single seat scout or attack aircraft having the capabilities of vertical takeoff, landing and hovering operations utilizing the X-Wing as the conventional helicopter rotating wing. After transition to forward flight, following takeoff, and reaching the appropriate cruising speed, the rotating wing is stopped and becomes a fixed wing having the "X" configuration. In order to reduce the dimensions (particularly for the main transverse frame of the fuselage) and weight of the aircraft, and to provide redundant flight control functions, two jet engines are provided, one engine being installed vertically above the other along the longitudinal axis of the aircraft. The engines provide the drive mechanism for the rotor via a common gear box, drive an air compressor utilized to provide compressed air in a controlled manner through slots formed on the blades of the X-wing, and provide the propulsive force for the aircraft. The engines are also utilized to provide pitch and yaw capability. Each engine and the core jet stream therefrom is ducted to a rectangular shaped nozzle having vectoring flaps for pitch control. The vectoring flaps also act as nozzle blockers in conjunction with the left and right hand side vectoring cascades used for yaw control. Additional pitch and yaw control may be provided by a control surface formed on the underside of the aircraft fuselage forward of the lower side cascades. Fixed wing surfaces are provided for additional lift capability and for external stores carriage. An ejection seat for the single crew member allowing emergency egress while in the X-wing flight mode configuration is also provided.

The present invention thus allows a single seat, light weight aircraft which can be utilized for both attack and scouting purposes to be fabricated, the light weight feature enabling the aircraft to reach the cruising speeds necessary to avoid enemy ground fire. The particular arrangement of the two engines and its coaction with the necessary aircraft control functions is accomplished in a manner such that a minimum of equipment is required, making the aircraft more cost effective and reliable than prior art convertible aircraft systems.

BRIEF DESCRIPTION OF THE DRAWING

For a better understanding of the invention, as well as further features and objects thereof, reference is made to the following description which is to be read in conjunction with the accompanying drawing wherein:

FIG. 3 is a cross-sectional view along line 3—3 of FIG. 2;

FIG. 4 is a plan view of the aircraft of the present invention illustrating in phantom interior components of the aircraft; and FIG. 5 is an elevation view of the aircraft of the present invention illustrating in phantom interior components of the aircraft.

DETAILED DESCRIPTION OF THE INVENTION

Figure 1:
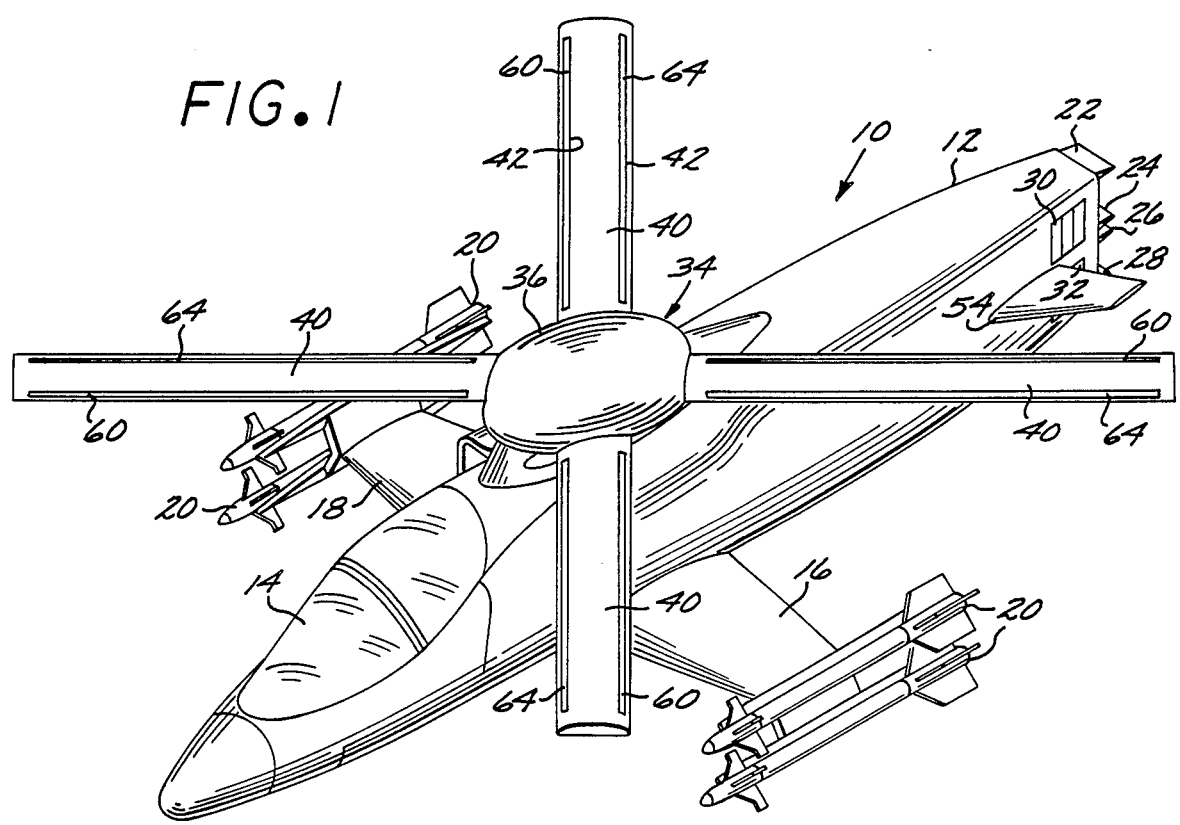
FIG. 1 is a perspective view of the aircraft of the present invention.

Referring now to FIG. 1, a perspective view of the novel aircraft 10 of the present invention is illustrated. Aircraft 10 comprises fuselage 12, cockpit 14, fixed wings 16 and 18, a plurality of rockets 20 secured to the fixed wings 16 and 18, vectoring flaps 22, 24, 26 and 28, vectoring cascades 30 and 32 and the X-wing/blade configuration 34. Configuration 34 comprises rotor head 36 and a plurality of rotor blades 40 having elongated slots 42 formed along the axis of the forward and aft edges of each blade 40. The rotor blades 40 are formed in the shape of an X. As described in somewhat more detail hereinafter, additional lift is provided by compressed air blown through slots 42 in a controlled and sequential manner. The X-blade configuration 34 and the controlled blowing system for forcing air through slots 42 has been developed by others as noted hereinabove, the present invention being directed to using the concepts in an aircraft which is lighter, faster and more economical than those now available. The cockpit 14 is designed to hold a single crew member and in the preferred configuration includes an ejection seat for the crew.

Figure 2:
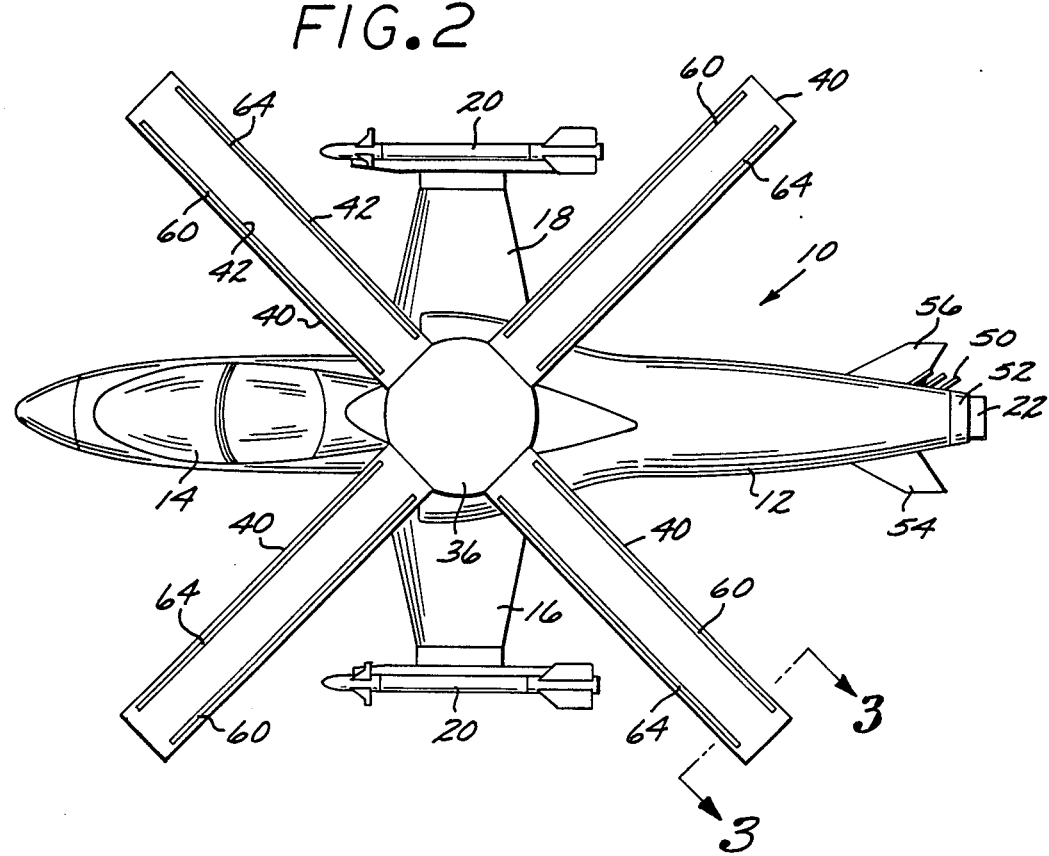
FIG. 2 is a plan view of the aircraft of the present invention.

FIG. 2 is a top plan view of aircraft 10 and shows right side vectoring cascade 50 (another vectoring cascade, not shown, is provided on the right rear area of fuselage 12), rectangular nozzle 52 and canted 45° ventral elevator/rudder surfaces 54 and 56.

Referring now to FIG. 3, a cross-sectional view of a rotor blade 40 is illustrated. As noted hereinabove, elongated slots 42 are provided in both the forward and aft edges of blade 40 but air is blown only through the slot of a blade edge when that blade edge is considered to be at the forward position of the rotational cycle of the blade. FIG. 3 illustrates the situation wherein the advancing edge blowing valve 60 is closed and the air stream 62 flows thereover whereas the rear, or aft, edge blowing valve 64 is open at this point of the blade rotational cycle, allowing compressed air through elongated slot 42.

Referring now to FIGS. 4 and 5, jet engines 70 and 72 are installed within the fuselage 12 of aircraft 10 substantially vertically one above the other along the longitudinal axis 74 of aircraft 10. This arrangement of engines reduces the transverse dimension of fuselage 12. The drive shafts 76 and 78 from engines 70 and 72 respectively, are coupled to clutches 80 and 82 respectively. Clutches 80 and 82 are in turn coupled to main gear box 84. The main gear box 84 is coupled to the rotor drive mechanism 86 which rotates the rotor drive shaft 88 when engines 70 and/or 72 are turned on. A drive shaft 90 from the main gear box 84 is coupled to an air compressor 92. An air inlet 91 is provided in compressor plenum 94 which directs the air to the compressor 92. The output air flow from the air compressor 92 is directed to a rotor blade blowing plenum/sequential blowing valve chamber 96 which contain small actuators for opening and closing the elongated, axial valves associated with blade slots 42 in a predetermined and sequential manner. The engine shafts 76 and 78 thus drive the rotor shaft 86 and compressor 92. As seen in FIGS. 4 and 5, engines 70 and 72 are located one above the other along the longitudinal axis 74 of aircraft 10 and provide redundant flight control functions. In other words, if either of the engines fail, all the functions provided by both in tandem will be taken over by the engine still operating, albeit the functions performed will be less satisfactory than if both engines were operable.

The core jet stream from both engines 70 and 72 are ducted to rectangular nozzle 52 having vectoring flaps 22, 24, 26 and 28 associated therewith, the vectoring flaps providing pitch control in a direction determined by the position of the vectoring flaps. Roll control of aircraft 10 is provided by the differential blowing from the slots 42 on blades 40. The vectoring flaps also act as nozzle blockers in conjunction with the left and right hand side vectoring cascades to provide for yaw control. Additional pitch and yaw control may be provided by the canted 45° ventral elevator/rudder surfaces 54 and 56 located on the underside of the fuselage 12 forward of the lower side cascades.

In operation, when engines 70 and 72 are turned on, the rotor shaft 88 is rotated causing the X-wing to rotate as a conventional helicopter wing. Compressor 92 is also actuated to provide the compressed air necessary to flow out through the selected blade slots 42. At takeoff, a substantial part of the thrust generated by the engines 70 and 72 is directed to the rotor shaft 88. When the aircraft 10 is aloft and reaches a desired cruising speed, typically 230 knots, clutches 80 and 82 are disengaged and the rotor blades 40 are positioned in the fixed wing configuration for maximum lift for conventional flying. In the fixed wing position, compressed air may be blown through both edges of blades 40 to provide for additional lift capability.

The vectoring cascades operate with the vectoring flaps to provide yaw and anti-torque control. Air blowing downward from slots 42 located on the aft edges of each blade will provide roll control determined by selecting the appropriate blade 40 to blow air from.

The fixed wing surface 16 and 18 provide for additional lift capability in the X-wing flight mode and for external stores carriage. Additional lift is provided by air blown through slots 42 both in the forward (leading) and aft (trailing) blade edges when aircraft 10 is in the X-wing flight mode.

The vertical arrangement of jet engines described hereinabove enables a small, light weight single seat helicopter using the X-wing configuration to be fabricated and, as a consequence, to be utilized either as a scouting or fighter aircraft. In particular, the vertical arrangement of jet engines and the multiple control functions provided reduces both the aircraft dimensions and the quantity of equipment required, resulting in an aircraft which is light weight and reliable.

While the invention has been described with reference to its preferred embodiments, it should be understood by those skilled in the art that various changes may be made and equivalents may be substituted for elements thereof without departing from the true spirit and scope of the invention. In addition, many modifications may be made to adapt to a particular situation or material to the teaching of the invention without departing from its essential teachings.

What is claimed is:

1. In an X-wing helicopter aircraft,
    a fuselage defining a longitudinal axis of said aircraft,
    a rotor assembly mounted on said fuselage for rotation at speeds below a predetermined value during helicopter phase operations and adpated to be stopped above said value to provide fixed X-wing airfoil,
    supplemental fixed wings attached to the fuselage,
    first, upper and second, lower jet engines mounted vertically one above the other and aligned vertically with respect to the longitudinal axis of the fuselage to provide symmetric and redundant flight control functions including yaw and pitch control, each of said engines providing a jet stream emanating therefrom rearwardly of said fuselage,
    said fuselage having a tail section including upper and lower exhaust nozzles through which said jet streams pass in straight lines,
    said nozzles each including means for controlling the direction of ejection of portions of the respective jet stream from said aircraft including
    upper engine movable upper and lower vectoring flaps and upper engine movable, port and starboard vectoring cascades, said cascades being equally proximate said upper engine jet stream, and
    lower engine movable upper and lower vectoring flaps and lower engine movable, port and starboard vectoring cascades, said lower engine cascades being equally proximate said lower engine jet stream,
    movement of said vectoring flaps in unison serving as pitch control for said aircraft, movement of vectoring flaps to close the nozzle serving as a nozzle blocker to activate the vectoring cascades for yaw control, movement of said cascades to open either port or starboard serving as primary yaw control,
    the movement of said vectoring flaps and cascades being equally functional in a lateral direction during helicopter phase maneuvers for either dual or engine-out operations.

2. The aircraft of claim 1 wherein drive shafts from each of said first or second jet engines are coupled to a gear box which is in turn coupled to a rotor drive mechanism causing said rotor shaft to rotate when the drive mechanism is actuated.

3. The aircraft as in claim 1 in which each of said engines is provided with a forwardly extending drive shaft, a common gear box accepting the outputs of each of said drive shafts and for coupling the combined power to drive the rotor.

4. The aircraft as in claim 3 further including an air compressor positioned within said fuselage, said air compressor having a drive shaft associated therewith, said drive shaft being driven from said gear box to compress said air.

5. The aircraft of claim 4 wherein said rotary wing comprises a plurality of rotor blades, each of said blades having elongated, axial slots on their forward and aft edges.

6. The aircraft of claim 5 wherein said compressed air is coupled to a chamber which directs the compressed air to said slots in a controlled, sequential manner.

7. The aircraft of claim 6 wherein the application of compressed air to said slots in said wing blades provides for control of aircraft roll.

8. The aircraft of claim 1 wherein said rotary wing becomes a fixed wing when the aircraft reaches a predetermined forward speed.

9. The aircraft of claim 1 further including surface means mounted to the underside of said fuselage to provide for additional control of yaw and pitch.

10. A single seat aircraft having an X-type wing which is rotatable for vertical takeoff and landing and capable of ceasing rotation during flight for increased forward speed and maneuverability, comprising:
    a main fuselage defining a longitudinal axis and including a single cockpit, and having engine air intakes and compressor intakes on opposing sides of said fuselage,
    a first and second fixed wings mounted on opposing sides of the fuselage,
    an X-type rotor-wing rotatably mounted to the top of the fuselage, said X-type rotor-wing having a plurality of rotor blades each having an axial passage extending along the length of the rotor and slots along leading and trailing edges of the rotor communicating with the respective axial passages for the controlled release of compressed air from said rotors in a sequential manner to control the maneuverability of the aircraft in flight,
    air compression drive means for receiving air from the air compressor intakes, compressing the air and distributing the compressed air to the axial passages of the X-type rotor-wing,
    first and second jet engines mounted vertically one above the other and aligned vertcially with respect to said longitudinal axis, said first and second engines respectively receiving air from the engine air intakes of the fuselage and directing first and second jet exhaust streams towards an aft end of the aircraft,
    first and second rotary power shafts, respectively coupled to said first and second jet engines, selectively receiving and communicating rotary torque therefrom,
    a common gear box connected to the first and second rotary power shafts for communicating rotary torque from the first and second rotary power shafts to the X-type rotor-wing and for further communicating rotary torque from the first and second rotary power shafts to the air compression drive means,
    an exhaust nozzle mounted in the extreme aft end of the fuselage perpendicular to the longitudinal axis of the fuselage;
    first and second pitch vectoring flap pairs, respectively rotatably mounted in the exhaust nozzle and rotating about an axis perpendicular to the longitudinal axis of the aircraft to respectively direct jet exhaust from the first and second jet engines in a generally vertical arc and control the pitch orientation of the aircraft in powered flight, said first pitch vectoring flap pair further being generally positioned within the exhaust nozzle to intersect a relatively dense core of jet exhaust from the first jet engine and said second pitch vectoring flap pair further being generally positioned within the exhaust nozzle to intersect a relatively dense core of jet exhaust from the second jet engine; and first and second yaw thrust vectoring flap cascades respectively mounted rotatably in opposing generally vertical sides of an aft portion of the fuselage and equally proximate the jet stream of the respective engine for respectively directing jet exhaust from the respective first and second jet engines in a generally horizontal arc and control the yaw orientation of the aircraft in powered flight, said first and second jet engines respectively provide rotary torque through the first and second rotary power shafts and gear box to rotate the X-type rotor-wing and provide aircraft vertical takeoff and landing and further respectively direct relatively dense cores of jet exhaust through the first and second pitch vectoring flap pairs and first and second yaw thrust vectoring flap cascades to control the pitch orientation of the aircraft and yaw orientation of the aircraft in powered flight.

* * * * *